Sept. 1, 1964
W. BRUGGER
3,147,331
ELECTRIC SHAFT FURNACE
Filed May 1, 1961
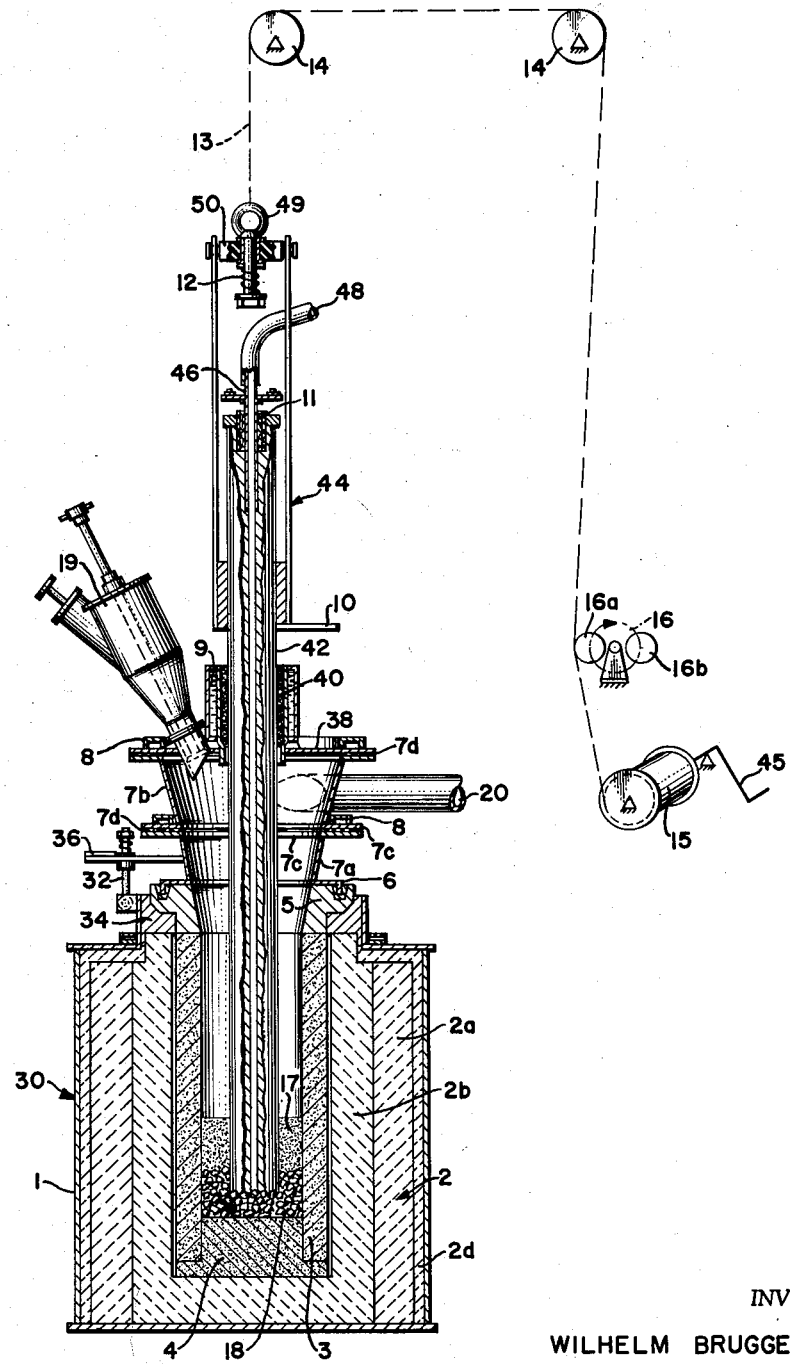
INVENTOR
WILHELM BRUGGER
BY *Mulflow and Toren*
ATTORNEYS

3,147,331
ELECTRIC SHAFT FURNACE
Wilhelm Brugger, Essen, Germany, assignor to
Th. Goldschmidt A.-G., Essen, Germany
Filed May 1, 1961, Ser. No. 106,836
Claims priority, application, Germany, May 14, 1960,
G 29,678
2 Claims. (Cl. 13—23)

This invention relates in general to an improved halogenating apparatus and method and in particular to a new and useful halogenating apparatus including a central movable electrode.

The invention is particularly directed to a process for chlorinating difficultly reacting oxide materials which are reacted in very high temperatures in the form of ore-coal briquettes with gaseous chlorine to obtain volatile chloride, and further relates to an improved apparatus for accomplishing the same.

In U.S. Patent 2,755,325 there is described an electrically heated shaft furnace of a type similar to that with which the present invention is concerned and which includes an exchangeable insert of artificial carbon (amorphous carbon and electrographite) which has a sufficient corrosion resistance to chlorine, hydrogen chloride, carbon monoxide and anhydrous metal halides, whether the metal halides are volatile or molten and even at very high reaction temperatures.

In the production of various volatile anhydrous halides, for example, the production of silicon tetrachloride, zirconium- and hafnium-tetrachloride, respectively, and beryllium chloride by the direct chlorinization of the usual starting materials, such as quartz sand, beryllium ore and zirconium sand, a very high reaction temperature of from 1600 to 1800° C. is required. An endothermic reaction occurs because of the high reaction temperature.

For carrying out such a halogenation process, considerable electric power must be supplied to the electrically heated reaction furnace. Extreme care must be taken from the beginning to insure that the reaction furnace is connected with a large plant for the condensation and removal of the volatile chloride produced. In order to avoid accidents in the operation of the apparatus, electrical insulation must be extremely efficient and difficulties in the operation of the electrode must be eliminated to permit operation of the reaction furnace with high voltage in the range of from 100 to 250 v. If low voltages of from 10 to 20 v. are applied, very high current intensities must be used and great difficulties are encountered at the contact points of the electrically heated reaction furnace. In addition, the chlorinating furnace is very evenly heated in its cross-section when a low voltage in the range of 10 to 20 v. and a high current of from 4 to 6 kilo amperes are applied, and the innermost brick layers of the lining are rapidly used up at the ensuing high temperatures.

The electrically heated shaft furnace with exchangeable insert, which is described in U.S. Patent 2,755,325, has a very low electrical resistance. By using different materials for its filler layer, for example coke, amorphous carbon or electrographite, its electrical resistance cannot be varied substantially when operating in the temperature range between 1600 and 1800° C. The ore-coal briquettes, which are used as starting materials, cannot be used directly in this temperature range for increasing the electrical resistance. This is so because the constituents of these briquettes undergo a structural change when heated to the high reaction temperatures and react chemically even in the absence of chlorine to separate the carbon monoxide and volatile silicon monoxide. In addition, if extremely high electric power is supplied to the reaction furnace the local overheating at the contact points of the fillers of the ore-coal briquettes with the center electrode or the artificial carbon insert and the contact points of these briquettes or fillers with each other is so high, due to the current densities, that it is impossible to obtain a somewhat constant electric power.

In accordance with the present invention, a resiliently suspended center electrode is provided which is continuously moved so that the different ore-coal briquettes or different fillers or different parts of the surface of these briquettes come continuously into contact with the central electrode and with each other. It was found, in accordance with the process and apparatus of the present invention, that the prior art difficulties in connection with the insulation and heating of the shaft furnace have been avoided. Due to the constant renewal of the contact surfaces of the briquetted starting material and of the fillers that are used for the current traansmission, stable electrical conditions are established in the interior of the chlorinating furnace, so that a constant current intensity can be easily regulated in the voltage range of from 20 to 60 v. in the preferred arrangement. The apparatus advantageously includes means moving the electrode in a vertical oscillatory path of movement, but may also include means for imparting rotary and a combination of rotary and reciprocating movement to the electrode. In the preferred embodiment, a vertical oscillation of a frequency of from 0.3 to 3 cycles per second with an oscillation amplitude of from 0.3 to 5 centimeters has proven most suitable. In some instances, it is desirable to impart a rotary movement onto the reciprocating or oscillating movement of the electrode. The apparatus advantageously includes an improved water-cooled stuffing box with asbestos as a packing material to accommodate the central electrode during its movement.

By employing a moving central electrode in a manner of the present invention, it is possible to regulate a limited constant current intensity in the range of 20 to 60 v. in which the furnace contacts can be expected to advance continuous operation. This is so because the current intensity depends only on the mean depth of immersion of the center electrode into the layer of the ore-coal briquettes to be chlorinated and into the layer of the fillers, respectively. In the vertically oscillating center electrode the current intensity varies slightly in accordance with the period of oscillation, but the mean current intensity remains constant.

It was also found that by applying higher voltages of from 20 to 60 v., particularly in the range of 30 to 40 v., with limited current intensities of from 2 to 3½ kilo amperes, for example, and an inside diameter of artificial carbon insert of 300 mm., a zone of maximum temperature is formed because of the high current density in the range of the center electrode. Much less heat is produced on the artificial carbon insert because of its substantially greater circumference compared to the center electrode. For this reason the brick-work is not heated extremely high in the apparatus and the carrying out of the process in accordance with the invention and a long life for the brick-work is insured. It was also found that when the voltage was increased and the current intensity reduced, that is, with the reduction of the depth of immersion of the moving center electrode into the layer of the ore-coal briquettes and into the layer of the fillers, respectively, this particularly hot zone diminishes in the immediate vicinity of the electrode. That is, the temperature drop becomes steeper in dependence on the distance from the center electrode. It is thus possible to influence in a simple manner the size of the reaction zone in the chlorinating furnace. At any rate, the hottest zone is exactly where the chlorine gas is introduced through the bored center electrode.

Accordingly, it is an object of this invention to provide an improved halogenating reaction apparatus construction.

A further object of the invention is to provide an improved chlorinating reaction furnace including a central hollow electrode for transmitting the chlorine gas therethrough and means for moving the central electrode during the carrying out of the reaction in the furnace.

A further object of the invention is to provide an improved reaction furnace including means for supporting a central electrode for movement into and out of a chlorinating reaction furnace.

A futher object of the invention is to provide a process for the direct halogenation of briquetted material including placing the briquetted material, such as oxidic ores and coals, into a furnace heated by a central electrode and moving the electrode during the reaction so that, depending on the depth of immersion of the center electrode into the layer of carbon containing briquettes to be chlorinated and into the fillers, respectively, including coarse pieces of coke or coal, a zone of maximum temperatures from 1,600 to 2,000° C. is formed in the range of a center electrode which dips into these layers when a voltage of from 20 to 60 v. is applied to the electrode thereby insuring a quantitative halogen consumption with a residue-free halogenation of the charge.

A further object of the invention is to provide a halogenation reaction furnace which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

The only figure in the drawings is a transverse section through a halogenation reaction furnace constructed in accordance with the invention.

Referring to the drawings in particular, the invention embodied therein includes an electrically heated shaft furnace generally designated 30 for the direct halogenation of briquetted material. The furnace 30 is provided with an outer shell 1 with a brick lining generally designated 2 separated by insulation 2d. The brick lining 2 advantageously includes fire-clay bricks 2a and an inner layer of sintered zirconium silicate bricks 2b. An exchangeable inner tube or insert 3 of amorphous carbon is located centrally of the brick layer 2b and is provided with a screw plug 4 at its lower end. The plug 4 is also of amorphous carbon.

A ring 5 of electrographite material is positioned on top of the insert 3 and is provided with a frusto conical diverging inner wall 5a. An annular steel contact plate 6 is located on top of the electrographitic ring 5 and is provided with a furnace dome including separate frusto conical sections 7a and 7b each having upper and lower flanges or ring members 7c, 7c. Packing material 7d is provided between the portions 7a and 7b and at the top of the portion 7b'. Water cooling is supplied through two vertically spaced hollow annular rings 8, 8. Suitable packing is supplied to maintain the rings 8 in water and gas tightness. The sections 7a and 7b are secured together such as by bolts (not shown) extending through the abutting flanges 7c of these parts. The packing material for the connecting surfaces includes three layers, namely asbestos, mica and asbestos and the metallic parts, including the screws, are insulated electrically by asbestos guides and washers. The furnace dome assembly is advantageously held by a clamping bolt 32 which is pivoted on a collar member 34 which surrounds the electrographitic ring 5 and it includes an upper portion which extends over a contact plate 36 which provides one terminal for an electrical connection.

The dome assembly includes a cover member 38 which is provided with an axially elongated portion 40 which includes a stuffing box portion 9.

The stuffing box 9 is provided for the passage of a bored hollow center electrode generally designated 42. The tubular extension 40 is hollow to provide for water cooling around the stuffing box portion 9. The stuffing box portion 9 is made of a textile fiber-free asbestos cord.

In accordance with the invention, the electrode 42 is suspended from a clamping member generally designated 44 which includes an electrical contact portion 10 which is connected to a source of electrical current energizing the electrode 42.

The clamp 44 is a frame member having an upper plate 50 of insulation material which is suspended by means of an I-bolt 49 on a strong spring 12. The I-bolt is held by a wire cable 13 which is directed around the guide rollers 14, 14 and over a winding drum or winch 15. The complete electrode 42 may be lowered or raised by unwinding or winding the cable 13 on the drum 15 by use of handle 45 or automatically by means of a deflecting pulley mechanism generally designated 16. Means (not shown) are provided to rotate the pulley assembly which includes offset pulleys 16a and 16b which are rotated against the cable 13 and deflect the cable in and out sufficiently to cause reciprocation of the electrode 42.

The upper end of the electrode 42 is provided with a stuffing box 11 which consists of two porcelain tubes with asbestos cord as a packing material to provide for the passage of a tube 46 to which is connected a flexible conduit 48 for the passage of chlorine gas therethrough.

The material to be chlorinated, 17, is arranged on a filler layer of coarse pieces of coke or artificial coal 18. The material to be charged is introduced through a hopper 19 into the furnace 30. The volatile chlorinization products exit from the bottom of the electrode 42 and escape upwardly through the filler 18 and the material 17 and out through a gas outlet 20. The gas outlet 20 is advantageously connected to a condensation plant.

In accordance with the invention, the central electrode 42 is oscillated upwardly and downwardly with an amplitude of between 2 and 3 centimeters and with a frequency of 1 cycle per second, for example.

The moving center electrode reduces the velocity of flow of the chlorine to be introduced and also reduces the velocity of flow of the resultant reaction gases and thus the overpressure in the furnace. This is resulted because the layer of the briquetted starting material is continuously loosened. The packing problems in the furnace are thus simplified. In order to improve the packing, the packing surfaces of the individual parts of the furnace dome are provided with water cooling. The vertically oscillating center electrode is not worn out in the construction described and thus does not require premature replacement. Any tendency for the wearing in the range of the briquetted layer by chemical corrosion is reduced and wear occurs only at the bottom of the electrode so that the life of the electrode is considerably extended.

An example of an operation of the device is as follows: A mixture of 50 kilograms of unground zirconium sand, 16 kilograms of peat coke powder carbon content 87% and 16 kilograms of sulfite spent liquor 31° Bé (water content 50%) is compressed in a granulating machine to briquettes of 3 mm. diameter and from 3 to 5 mm. in length and then dried at 160° centigrade.

The water content of the dried briquettes is from 2 to 2½%, including the constitutionally combined water.

The chlornating furnace with an artificial carved carbon insert of 300 mm. inside diameter (outside diameter 500 mm.) and with the moving resiliently supported bored central electrode of 130 mm. outside diameter is so charged with the above described mixture that the height of the charge of the briquetted starting material is kept between 20 and 25 centimeters with 50 kilograms per unit of height chlorine being introduced through the bored center electrode. 25 kilograms of the above described mixture are re-charged every half hour. Due to the high reaction temperature of the innermost zone of the chlorinating furnace, the starting material is reacted without any residue to zirconium tetrachloride and silicon tetrachloride, the gases issuing from the furnace containing neither free chlorine nor carbonyl chloride. The gases escaping from the furnace contain, in addition to the silicon tetrachloride, zirconium tetrachloride and carbon monoxide and also small quantities of hydrogen, hydrogen chloride, disulfur chloride, hydrogen sulfide and silicon chloroform. Because of the extremely high reaction temperature in the immediate vicinity of the center electrode inside the layer of the material to be chlorinated and of the filler layer, there is still obtained a quantitative chlorine consumption even with the small height of charge of 8 to 10 centimeters of the briquettes to be chlorinated.

The chlorinating furnace, according to the invention, can also be used for the production of bromides or iodides by direct halogenation. It can be used in general for all processes which are carried out at high temperatures and where volatile reaction products are to be produced with gases by reaction of carbon-containing briquettes or other solid materials which are electrically conductive. Though reaction temperatures above the boiling point of these salt melts are to be avoided in the production of molten halides, the moving center electrode means constant electric operating conditions and avoidance of the formation of bridges to the material to be halogenated, and uniform chlorine distribution and chlorine consumption, compared to the known chlorinating surfaces.

While a specific embodiment of the invention has been shown and described in detail to illustrate the application of the invention principles, it will be understood that the invention may be embodied otherwise without departing from such principles.

What is claimed is:

1. An electrically heated shaft furnace for the direct halogenation of briquetted material comprising brick means defining a central reaction chamber, a hollow carbon insert in said chamber defining a space at the interior thereof for said briquetted material, a dome closing said reaction chamber, a central hollow electrode extending through said dome and into the center of said carbon insert, electrical means for energizing said carbon insert and said central carbon electrode, means for directing a halogen gas through said electrode and into said reaction chamber, and means for oscillating said central carbon electrode through a vertical up and down movement during the reaction in the reaction chamber for positioning the electrode to establish stable electrical conditions in the furnace during operation.

2. An electrically heated shaft furnace for the direct halogenation of briquetted material comprising brick means defining a central reaction chamber, a hollow carbon insert in said chamber defining a space at the interior thereof for said briquetted material, a dome closing said reaction chamber, a central hollow electrode extending through said dome and into the center of said carbon insert, electrical means for energizing said carbon insert and said central carbon electrode, means for directing a halogen gas through said electrode and into said reaction chamber, and means for oscillating said central carbon electrode during reaction in the reaction chamber including a drum having an offset roller thereon, and cable means for suspending said electrode disposed to bear against said drum and being displaceable by movement of said offset roller during rotation of said drum.

References Cited in the file of this patent

UNITED STATES PATENTS

| | | |
|---|---|---|
| 1,129,512 | Peacock | Feb. 23, 1915 |
| 1,463,970 | Pope | Aug. 7, 1923 |
| 1,562,684 | Brown | Nov. 24, 1925 |
| 1,756,457 | Fourment | Apr. 29, 1930 |
| 1,984,809 | Re Qua | Dec. 18, 1934 |
| 2,378,675 | Agnew et al. | June 19, 1944 |
| 2,755,325 | Brugger | July 17, 1956 |
| 2,912,476 | Aschoff | Nov. 10, 1959 |
| 2,931,705 | Girardot | Apr. 5, 1960 |
| 3,053,975 | Nelson et al. | Sept. 11, 1962 |